United States Patent [19]
Foster

[11] Patent Number: 4,785,929
[45] Date of Patent: Nov. 22, 1988

[54] BEARING SYSTEM FOR RECIPROCATING FLOOR CONVEYOR

[76] Inventor: Raymond K. Foster, P.O. Box 1, Madras, Oreg. 97741

[21] Appl. No.: 59,376

[22] Filed: Jun. 4, 1987

Related U.S. Application Data

[63] Continuation-in-part of Ser. No. 680,069, Dec. 10, 1984, Pat. No. 4,679,686, which is a continuation-in-part of Ser. No. 346,865, Feb. 8, 1982, Pat. No. 4,492,303.

[51] Int. Cl.$^4$ ............................................. B65G 25/00
[52] U.S. Cl. .................................. 198/750; 414/525.1
[58] Field of Search .................... 198/750, 773–775; 414/525 R, 525 B

[56] References Cited

U.S. PATENT DOCUMENTS
4,679,686 7/1987 Foster ................................. 198/750

*Primary Examiner*—Robert J. Spar
*Assistant Examiner*—D. Glenn Dayoan
*Attorney, Agent, or Firm*—Delbert J. Barnard

[57] ABSTRACT

A floor member (10, 10', 124) of channel form is pushed downwardly to install it onto bearings (32, 32', 32") which have been previously installed onto guide tubes (14) which extend in the same direction as the floor members (10, 10', 124). The bearings (32, 32', 32") have sidewall portions (60, 62, 108, 110) which slope downwardly and outwardly to a lower edge (64, 66, 138, 140). These sidewalls (60, 62, 108, 110) are connected at their upper portions to the bearings (32, 32', 32") in such a way that they will flex inwardly, into spaces provided for them, in response to the downward "snap on" movement of the floor members (10, 10', 124). Brace wings (48, 50, 130, 132) may be provided to function together with the lower edges (64, 66, 138, 140) to hold the floor members (10, 10', 124) onto the bearings (32, 32', 32"). Bearings (32, 32', 32") themselves snap onto the guide beams (14). These bearings (32, 32', 32") include lock flanges in the form of cantilever springs, resulting in a good tight fit despite size differences which may exist due to low manufacturing tolerences.

15 Claims, 9 Drawing Sheets

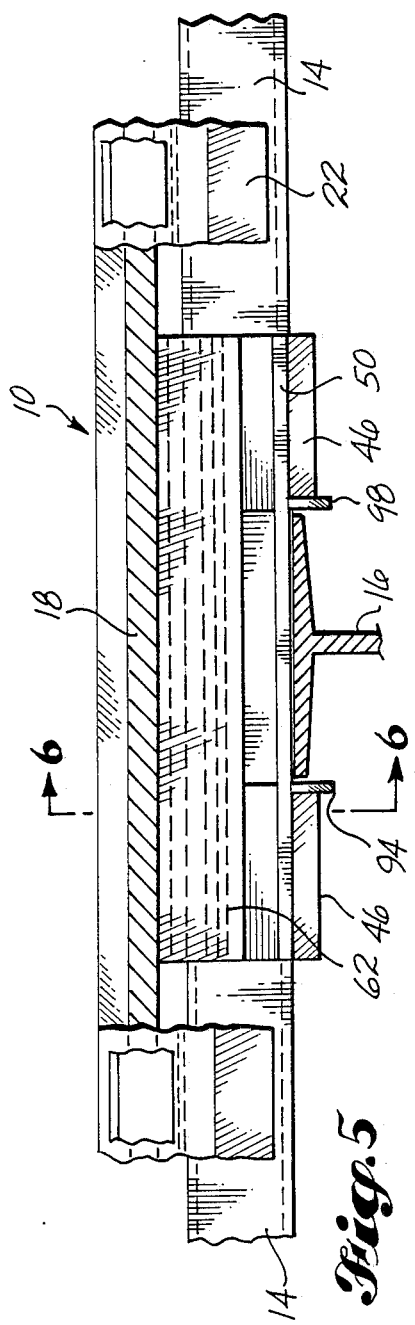
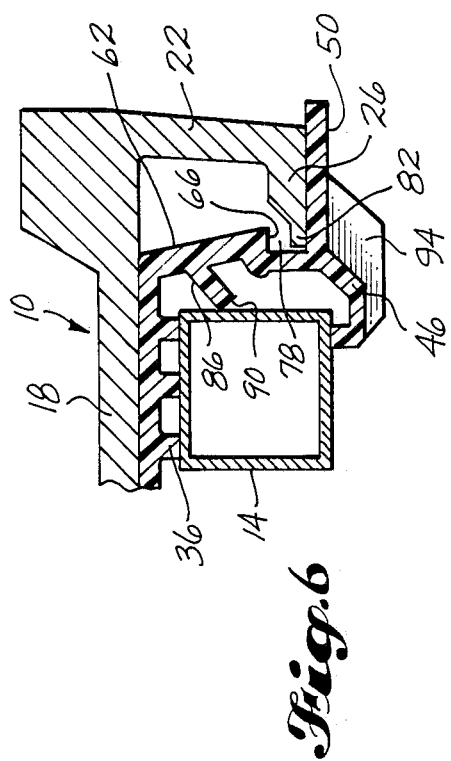

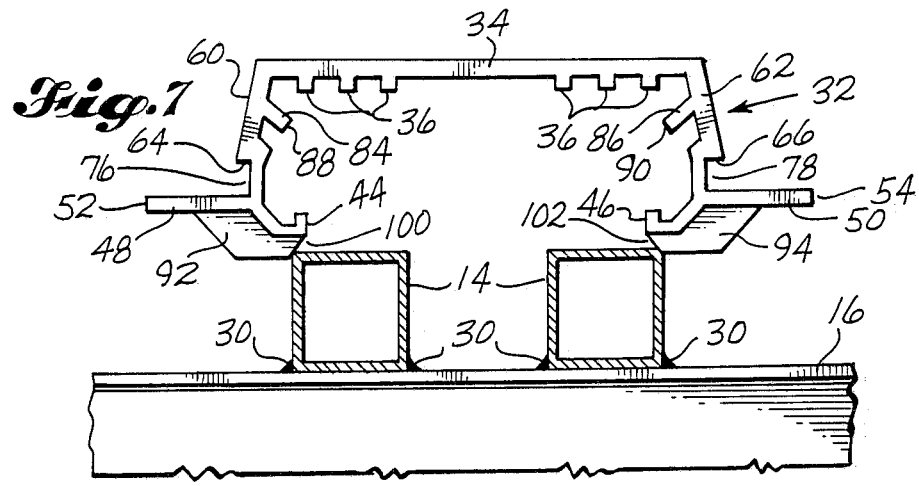
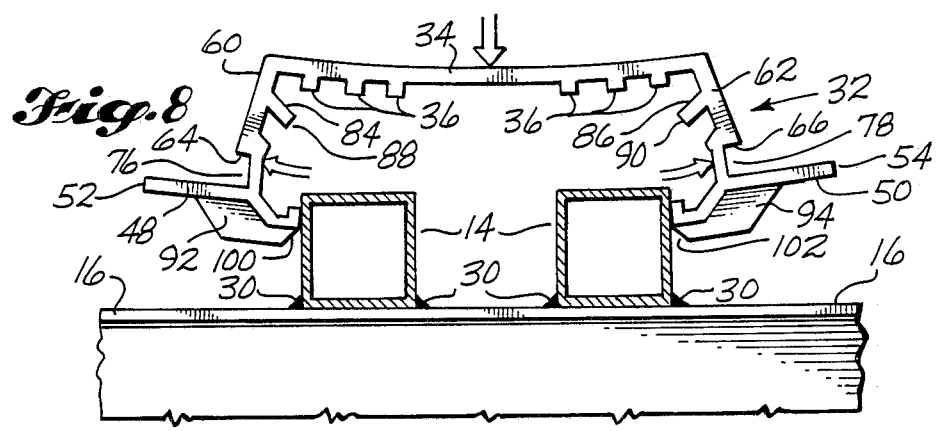
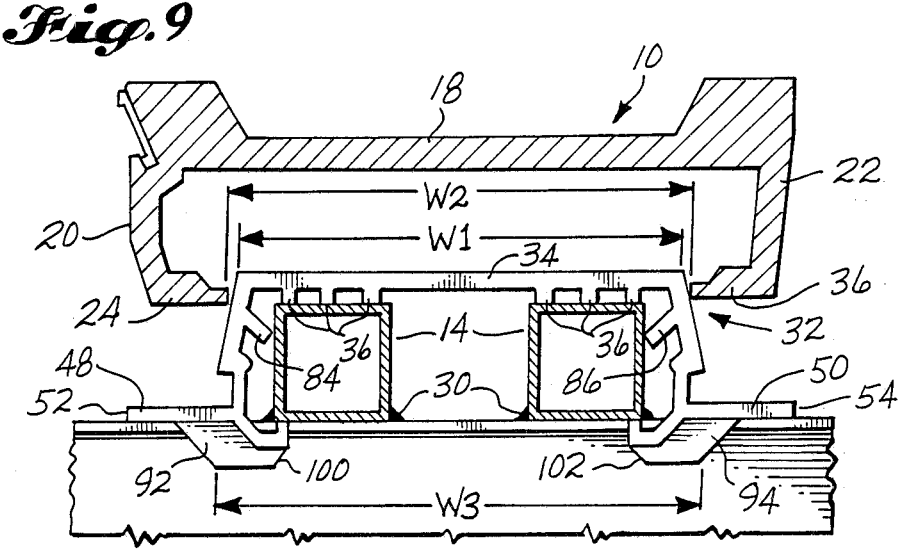

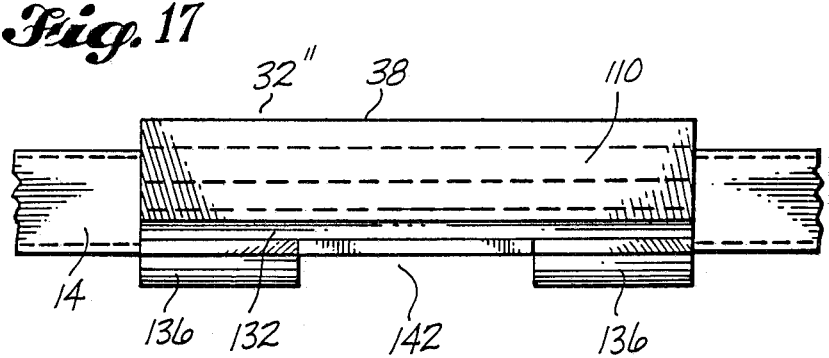
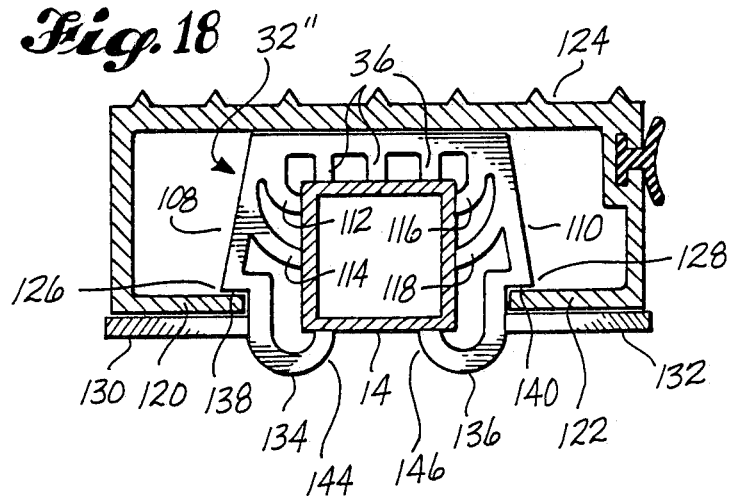
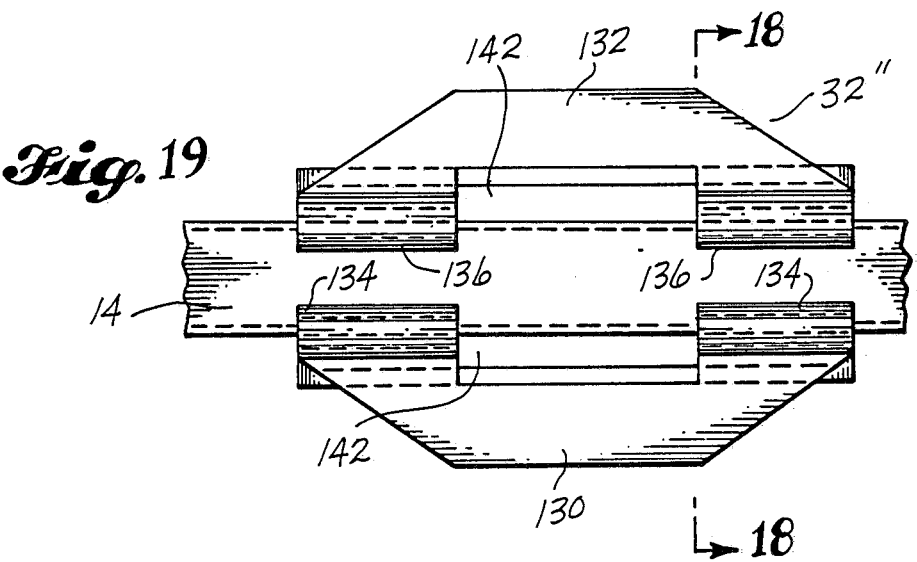

1

BEARING SYSTEM FOR RECIPROCATING FLOOR CONVEYOR

RELATED APPLICATION

This application is a continuation-in-part of my prior application U.S. Ser. No. 680,069, filed Dec. 10, 1984, now U.S. Pat. No. 4,679,686 entitled "Bearing System for Reciprocating Floor Conveyor," which in turn is a continuation-in-part of my prior U.S. application Ser. No. 346,865, filed Feb. 8, 1982, now U.S. Pat. No. 4,492,303 and entitled, "Improved Drive/Guide System for a Reciprocating Floor Conveyor."

TECHNICAL FIELD

This invention relates to improvements in reciprocating floor conveyors, and in particular to an improvement of a plastic slide bearing used for supporting the floor members of such conveyors for longitudinal reciprocation. More specifically, this invention relates to a bearing structure which will allow the floor members to be easily snapped into place from above.

BACKGROUND ART

The floor members in a reciprocating floor conveyor ride on self-lubricating plastic slide bearings. The floor members, as they are driven, are subjected to forces which tend to push the floor members upwardly. The floor members, as they move relative to the bearings, impose forces on bearings which tend to rip the bearings off of their guide beams.

I first addressed this problem by constructing the bearings to have wings which project sideways into abutting contact with wings of adjoining bearings. This contact resulted in a mutual bracing of the bearings across the floor of the conveyor, as is described in detail in my aforementioned U.S. Pat. No. 4,492,303.

It is desirable to be able to install the floor members on the bearings by setting each floor member down on top of its bearings and then pushing down on the floor member so that it will "snap" in place. This was possible with the type of bearing developed by Hallstrom in U.S. Pat. No. 4,184,587, issued Jan. 22, 1980, so long as the top panel of the floor member was thin enough to bend. The Hallstrom bearings are constructed from a relatively rigid material. Also, the side parts of the bearings are tight against the guide beams. There is no way for these side parts to spring inwardly. Thus, a floor member can be installed from above only if its sides are capable of springing apart.

The forces imposed by the floor members on the bearings also tend to move the bearings lengthwise along the guide beams. The Hallstrom-style bearing shown in U.S. Pat. No. 4,184,587, and the prior Foster bearings attempted to lock the bearings at the intersections of the guide beams with transverse support means for the guide beams. However, under some conditions of use, the forces have been able to move the bearings past the support beams and bunch them up or force them off of the guide beams.

DISCLOSURE OF THE INVENTION

Plastic slide bearings constructed in accordance with the present invention, are characterized by a top which when the bearing is installed is positioned above a guide beam means and side parts which depends from the top into positions outwardly adjacent the sides of the guide beam means. Preferably, a bottom lock flange is provided that projects inwardly from each side part below the guide beam means. A wing is provided on each side of the bearing and each wing extends laterally outwardly from the bearing. The wings are in coplanar parallelism with each other and are spaced below and in parallelism with the top of the bearing. Each wing has an outer edge which preferably makes mutually bracing contact with the outer edge of an adjacent wing on an adjacent plastic slide bearing.

The bearing top is of a width smaller than the space between two bottom flanges of a floor member. Each side part of each bearing includes a sidewall which slopes downwardly and outwardly to a lower edge. A space is defined by and between each sidewall and an adjoining side of the guide beam means. The bearing has a width at the level of the lower edges of the sidewalls which is wider than the width of the space between the two bottom flanges of the floor member. Each sidewall lower edge is spaced above the upper edge of the wing on its side of the bearing and with the wing defines a slot in which an inner edge portion of the bottom flange of the floor member on its side of the bearing is received. Each sidewall is resiliently connected to the bearing and is movable inwardly into the space between it and the adjoining side of the guide beam means. This allows the floor member to be set down on top of the bearing with the top of the bearing positioned in the space between the two bottom flanges of the floor member and allows the floor member so positioned to then be pushed downwardly. The downward force applied by the flanges of the floor member on the sidewalls of the bearing causes the sidewalls to swing inwardly to allow the floor member to move downwardly until the bottom flanges are in the slots defined between the bottom edges of the sidewalls and the top surfaces of the wings. When the bottom flanges are in such slots, the sidewalls will swing outwardly into unstressed positions placing the lower edges above the bottom flanges of the floor member.

In accordance with an aspect of the invention, the side portions of the bearings are each provided with at least one inwardly directly rib of rigid material having an inner edge which contacts or is contiguous its side of the guide beam means when the bearing is installed on the guide beam. The rib slopes downwardly and inwardly. As a result, it will bend and swing in response to movement of the floor member downwardly onto the bearing to cause the sidewall of the bearing to flex inwardly.

According to another aspect of the invention, bearings are positioned on a guide beam means at the intersections of the guide beam means and a traverse support beam on which the guide beam means are supported. Each such bearing includes gussets depending below its bottom lock flanges into positions outwardly bounding the top portion of the support beam. The abutments so positioned function to lock the bearing in place and resist a sliding of the bearing lengthwise of the guide beam means away from the support beam in response to longitudinal forces imposed on the bearing by the floor member. The gussets also stiffen the bearing sidewalls and the lock flanges.

In accordance with yet another aspect of the invention, the gussets have end located cam surfaces directed towards the guide beam means which are sloped and are positioned so that the bearing can be set down onto the guide beam means and the cam surfaces of the gussets will contact side boundaries of the guide beam means. A downward force can then be applied to the bearing and such force will cause the cam surfaces to interact with the side boundaries of the guide beam means to in turn cause a spreading apart of the side parts of the bearing. The sidewalls will bend where they are attached to the top. The downward force will cause a downward movement of the bearing until the lock flanges are below the guide beam means. At this time, the side parts of the bearing will move inwardly and the lock flanges will move into position below the guide beam means.

The guide beam means may comprise one or two guide beams and the space between the side parts of the bearing may be sized to receive guide beam means in the form of one or two guide beams.

Additional features, advantages and objects of the invention are described in the detailed description of the best mode and preferred embodiments. Such detailed descriptions and the claims which follow are both also parts of the description of the invention.

BRIEF DESCRIPTION OF THE DRAWINGS

In the drawings, like element designations refer to like parts throughout, and:

FIG. 5 is a sectional view taken substantially along line 5—5 of FIG. 3 with a foreground side portion of the floor member cut away;

FIG. 6 is a fragmentary end view of a bearing, taken substantially along line 6—6 of FIG. 5 and showing a portion of the bearing set down on a guide beam;

FIG. 7 is an end view showing a bearing setting on top of the guide beams prior to an application of downward pressure on the bearing;

FIG. 8 is a view similar to FIG. 7, but showing a downward pressure applied to the bearing to cause the sides of the bearing to swing apart;

FIG. 9 is a view like FIGS. 7 and 8, showing a floor member setting on the bearing prior to application of a downward force on the floor member to secure the floor member to the bearing;

FIG. 17 is a side elevational view of a third form of the bearing installed onto a guide beam;

FIG. 18 is a cross-sectional view taken substantially along lines 18—18 of FIG. 19; and FIG. 19 is a bottom plan view of the bearing shown in FIGS. 17 and 18.

BEST MODE FOR CARRYING OUT THE INVENTION

Figure 1:
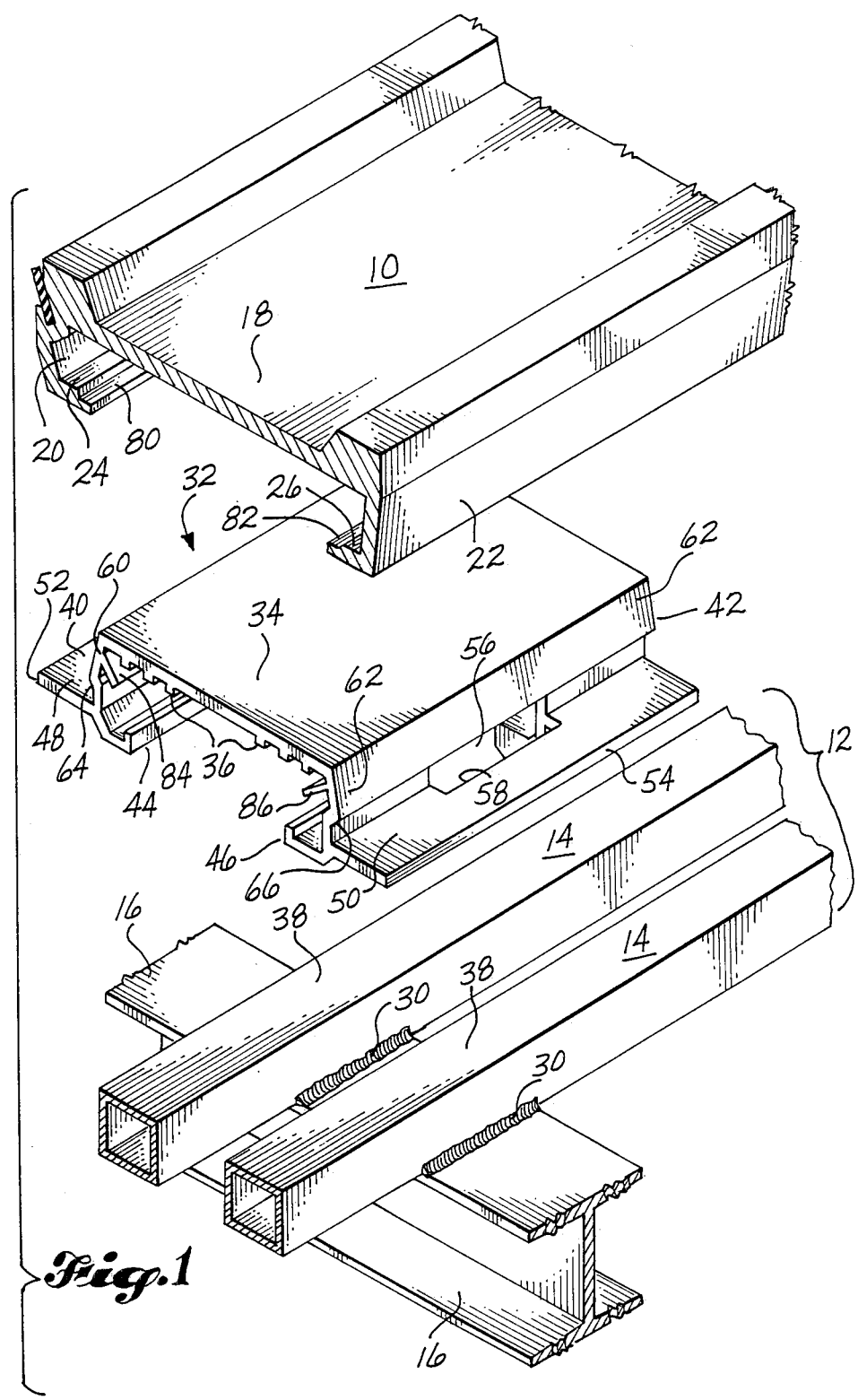
FIG. 1 is an exploded isometric view of a slide bearing member spaced above two guide beams and a floor member spaced above the bearing.

The floor members and the drive mechanism for moving the floor members are per se not a part of the present application. By way of typical and therefore nonlimitive example, the drive mechanism may be like the drive mechanism disclosed in my aforementioned U.S. Pat. No. 4,492,303 or in my copending application Ser. No. 905,370, filed Sept. 8, 1986, and entitled Drive/Frame Assembly For A Reciprocating Floor.

FIGS. 1-6 and 11-16 show supporting framework for reciprocating floor members 10. The framework includes longitudinal guide beam means 12 which may be one or two guide beams 14, one for each floor member 10, and a plurality of traverse support beams 16 to which the guide beam means 12 are welded. The aforementioned copending parent application and patent each discloses the supporting framework in more detail.

Figure 2:
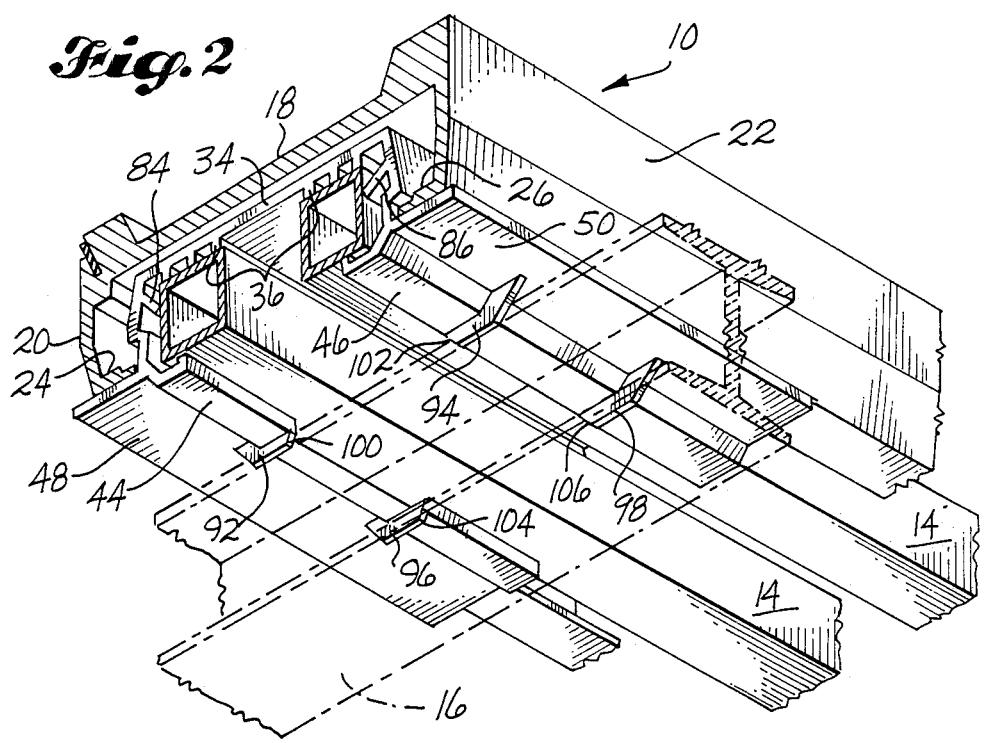
FIG. 2 is an assembled isometric view of the components of FIG. 1 taken from below.
Figure 16:
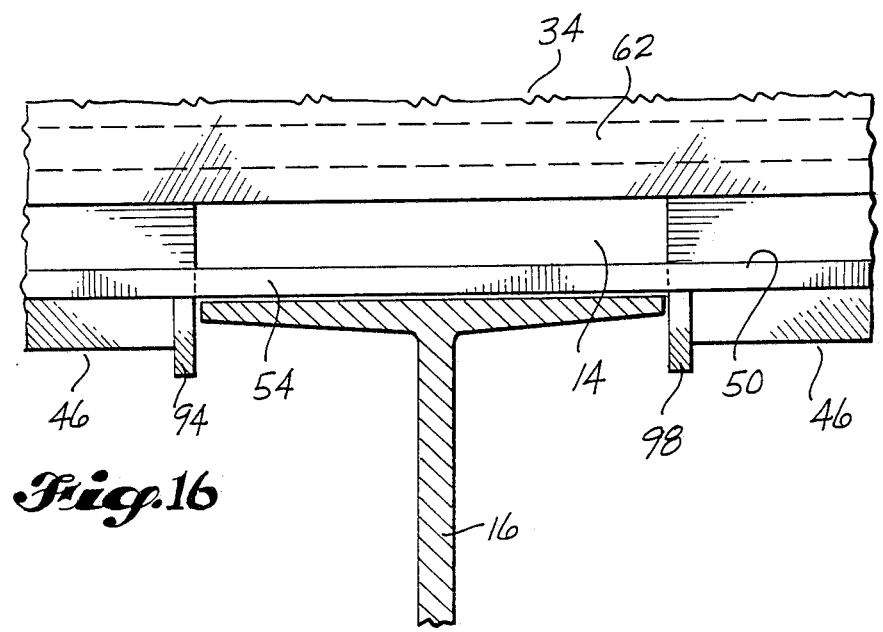
FIG. 16 immediately follows FIG. 2 and is a fragmentary side view of the bearing setting on a transverse support beam which is in a section, and showing the relationship of the ribs or gussets to the transverse support beam.
Figure 3:
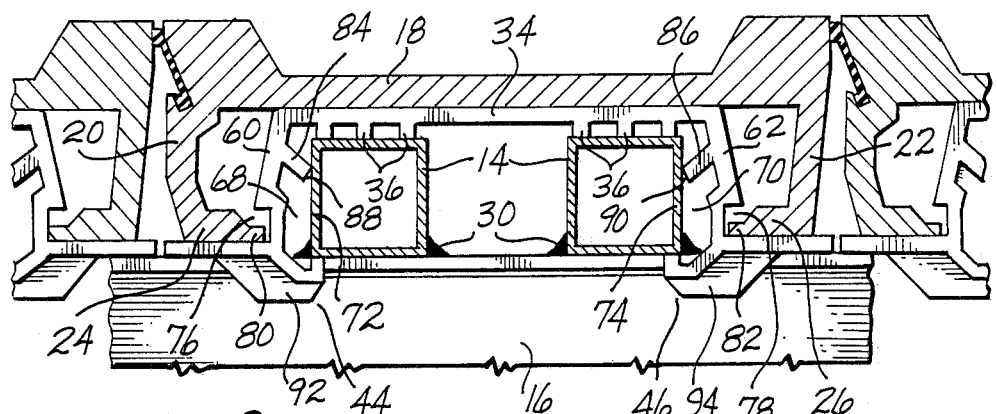
FIG. 3 is a cross-sectional view of a floor member and its guide beams taken substantially along line 3—3 of FIG. 5, and showing an end view of the bearing and a complete floor member and bearing flanked by fragments of the adjoining floor members and bearings.
Figure 4:
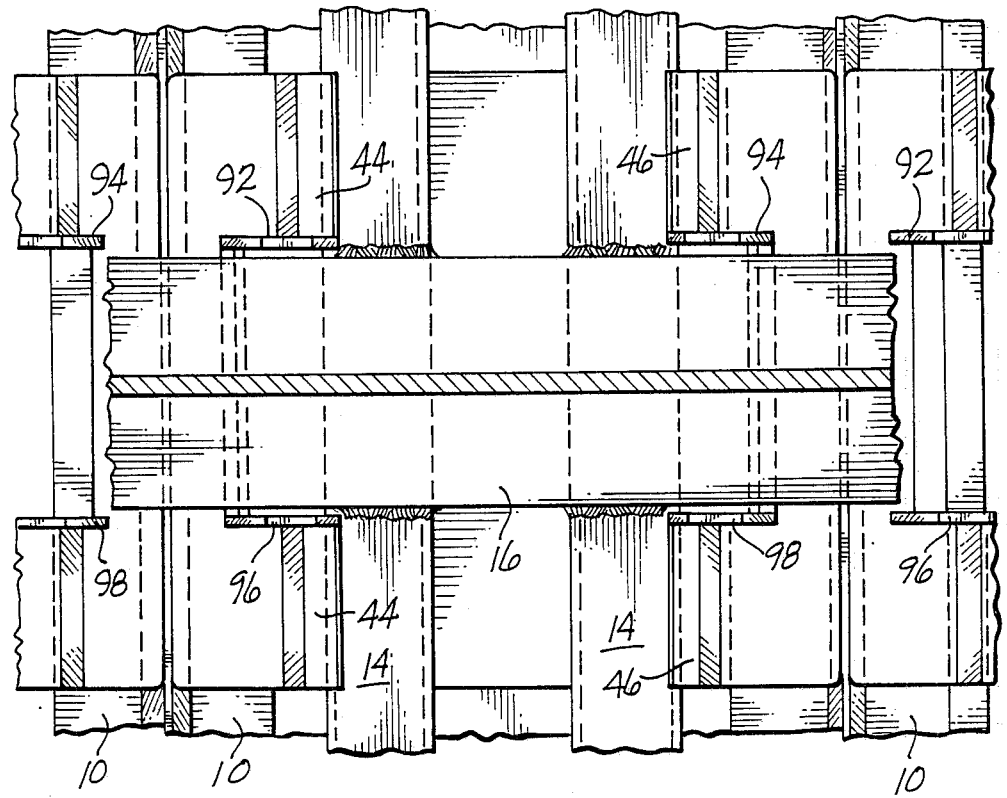
FIG. 4 is a fragmentary bottom plan view of the assembly shown in FIG. 3.

Referring to FIGS. 1, 2 and 3 in particular, each floor member 10 is shown to have a top wall 18, a pair of sidewalls 20, 22 extending downwardly from the top wall 18 and a pair of bottom flanges 24, 26 which project inwardly from the sidewall 20, 22 and define a space 28 (FIG. 1) between them.

The guide beam means 12 may be two laterally spaced apart guide beams 14 constructed from tubular steel. The guide beams 14 are preferably welded to the traverse beams 12 by fillet welds 30 placed on opposite sides of beams 10 as shown by FIGS. 1, 3 and 7-10.

A first bearing 32, constructed in accordance with the present invention, comprises a top 34 positioned over the guide beams 14. Top 34 may include downwardly projecting ribs 36 having lower edges which make contact with the upper surfaces 38 of guide beams 14.

Bearing 32 includes side parts 40, 42 which are connected at their tops to the top 34 and depend from top 34 downwardly into positions on the outer sides of guide beams 14. Bearing 32 also includes a pair of lock flanges 44, 46. Lock flange 44 extends inwardly from the lower edge of side part 40. Lock flange 46 extends inwardly from the lower edge of side part 42. When the bearing 32 is installed on guide beams 14, lock flanges 44, 46 are located below the outside lower side edges of the beams 14 (as shown in FIGS. 2 and 3, for example).

Bearing 32 includes a wing 48, 50 on each of its sides. Wing 48 extends laterally outwardly from side part 40. Wing 50 extends laterally outwardly from side part 42. Wings 48, 50 include outer edges 52, 54 which preferably make mutual bracing and abutting contact with an outer edge 52 or 54 of an adjoining wing 48 or 50 of an adjacent bearing 32. That is, in preferred form, edge 52 will substantially contact an edge 54 of a bearing 32 which is mounted onto guide beams 14 for the next floor member 10. This relationship is shown in FIG. 3.

A cutout region 56 is provided at the inner central portion of each wing 48, 50, so that each wing presents an inner edge 58 which is spaced away from the adjoining side surface of the adjacent guide beam 14 a sufficient distance to allow use of a relatively large size fillet weld 30. The wings 48, 50 are in coplanar parallelism with each other and are spaced below and in parallelism with the top 34 of the bearing 32.

Bearing top 34 is of a width W1 smaller than the width W2 (FIG. 9) between the two bottom flanges 24, 26 of the floor member 10.

According to the invention, each side part 40, 42 of bearing 32 includes a sidewall 60, 62 which slopes downwardly and outwardly to a lower edge 64, 66. A space 68, 70 (FIG. 3) is defined between each sidewall 60, 62 and an adjoining side 72, 74 of an adjacent guide beam means 14. Bearing 32 has a width W3 (FIG. 9) at the level of the lower edges 64, 66 of the sidewalls 60, 62 which is wider than the width W2 of the space between the two bottom flanges 24, 26 of the floor member 10. Each sidewall lower edge 64, 66 is spaced above the upper surface of the wings 48, 50 on its side of the bearing 32. Longitudinal slots 77, 78 are formed vertically between the edges 64, 66 and the wings 48, 50. Inner edge portions 80, 82 of the bottom flanges 24, 26 of the floor member 10 are received in the slots 78, 80.

Each sidewall 60, 62 is resiliently connected at its top to the top 34 of the bearing 32 and is movable inwardly into the space 68, 70 between it and the adjoining side 72, 74 of the adjacent guide beam 14.

The design of bearing 14 allows the floor members 16 to be "snapped" into place. The installation involves setting the floor member 10 on the bearing 32 with the top 38 of the bearing 32 positioned in the space W2 between the two bottom flanges 24, 26 of the floor member 10 (FIG. 9). The floor member 10 is then pushed downwardly. A downward force applied by the flanges 24, 26 of the floor member 10 on the sidewalls 60, 62 of the bearing 14 will cause the sidewalls 60, 62 to swing inwardly to allow the floor member 10 to move downwardly until the bottom flanges 24, 26 are in the slots 76, 78 defined by and between the bottom edges 64, 66 above the bottom flanges 24, 26 of the floor member 10.

As shown in FIGS. 7 and 8, the lock flanges 44, 46 have upper portions 86, 88 connected to the sidewalls 60, 62 of the bearing 14 inwardly of the connection of the wings 48, 50 to the sidewalls 60, 62. The sidewalls 60, 62 function as a cantilever beam bending at their connections to the top 38 of the bearing 32 in response to a downward force imposed on the bearing 32 (FIG. 8). This cantilever beam function allows the sidewalls 60, 62 to swing outwardly of the guide beam walls 72, 74 and then swing inwardly once the lock flanges 44, 46 snap in place under the guide beam 14.

Figure 10:
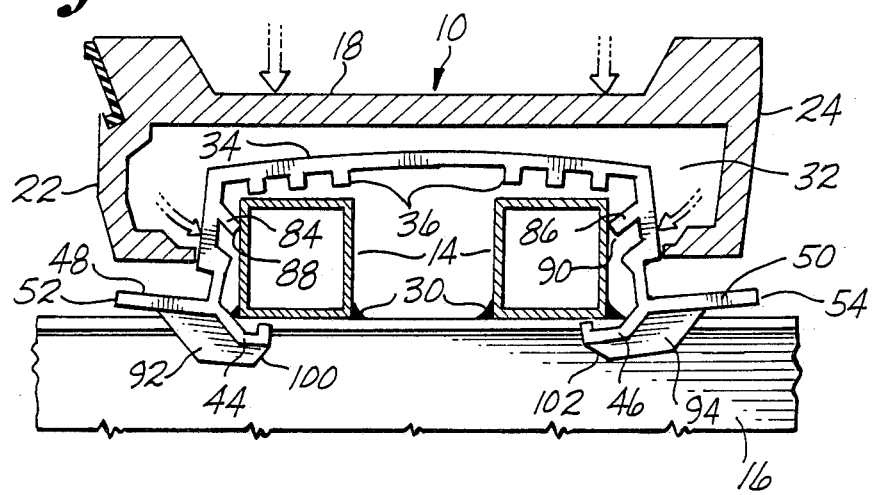
FIG. 10 is a view similar to FIG. 9 but showing a downward force applied on the floor member, to cause the floor member to move downwardly and the sidewalls of the bearing to swing inwardly.
Figure 11:
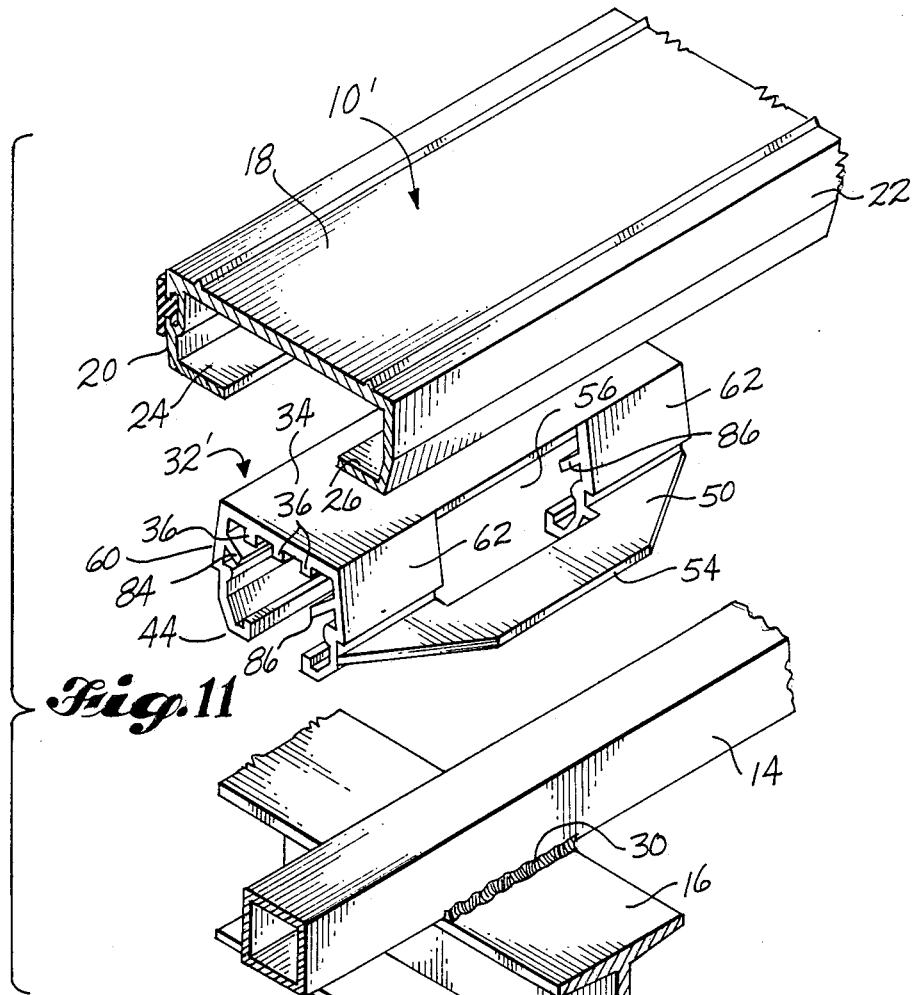
FIG. 11 is an exploded isometric view of a second form of slide bearing spaced above a single guide beam and a floor member spaced above the bearing.

Referring to FIGS. 9 and 10, each bearing sidewall 60, 62 preferably includes at least one inwardly and downwardly directed rib 84, 86, each having an inner edge 88, 90 which contacts or nearly contacts a guide beam side surface 72, 74 when the bearing 32 is installed on the guide beams 14. The ribs 88, 90 slope downwardly from the sidewall 60, 62 and, as a result, they bend and swing in position in response to movement of the floor member 10 downwardly onto the bearing 32. This allows the sidewalls 60, 62 of the bearing 32 to flex inwardly as the edges 80, 82 of the bottom flanges 24, 26 of the floor member 10 force the sidewalls 60, 62 inwardly as a downward force is applied to floor member 10.

Each plastic slide bearing 32 is positioned at an intersection of guide beams 14 and a support beam 16. Each bearing 32 includes gussets 92, 94, 96, 98 which depend from the wings 48, 50 and the bottom lock flanges 44, 46 into positions outwardly bounding the side edges of the support beam 16. The gussets 92, 94, 96, 100 function as abutments to lock the bearing 32 in place and resist a sliding of the bearing 32 lengthwise of the guide beams 14 away from the support beam 16 in response to longitudinal forces imposed on the bearing 32 by the floor member 10. The gussets 92, 94, 96, 98 are vertical walls of the bearing material which extend between and interconnect lower portions of the lock flanges 44, 46 and lower portions of the wings 48, 50 and thus brace each from the other.

The gussets 92, 94, 96, 98 each have inner end located cam portions 100, 102, 104, 106. These cam portions 100, 102, 104, 106 are positioned vertically below the lock flanges 44, 46. The cam portions slope downwardly and outwardly and are positioned so that a bearing 32 can be set down onto the guide beams 14 and the cam portions of the gussets will contact upper corners and slide boundaries of guide beams 14 (FIG. 7). A downward force applied to bearing 32 will cause the cam portions 100, 102, 104, 106 to interact with the upper corners and side boundaries of guide beams 14 to cause a spreading apart of the side parts 40, 42 of the bearing 32, placing the lock flanges outside of the guide beams (FIG. 9) until the lock flanges 44, 46 are below the guide beams 14. At that time, the side parts 40, 42 of bearing 32 move inwardly to position the lock flanges 44, 46 into a position below the lower outer corners of the guide beams 14.

FIGS. 11–15 show a bearing construction and assembly that is like the bearing construction and assembly shown by FIGS. 1–10 except that the floor slat member 10' is smaller and the bearing 32' is sized to fit onto a single guide beam 14. Accordingly, the bearing 32' and its assembly will not be specifically described. Rather, the reference numerals used in FIGS. 1–10 are also used in FIGS. 11–15, to designate the corresponding parts. Thus, the description of the embodiment of FIGS. 1–10 also constitutes a description of the embodiment of FIGS. 11–15.

Figure 12:
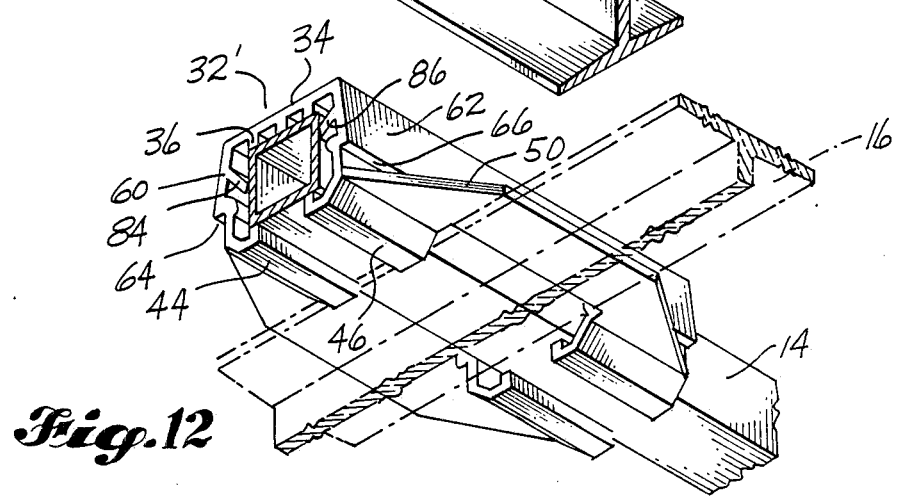
FIG. 12 is an assembled isometric view of the bearing shown in FIG. 11, taken from below.
Figure 13:
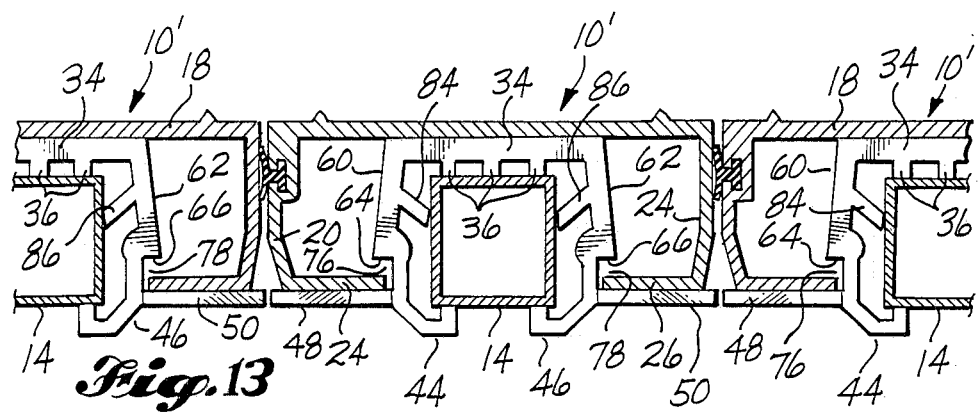
FIG. 13 is a view like FIG. 3, but of the floor member and bearing construction shown by FIGS. 11 and 12.
Figure 14:
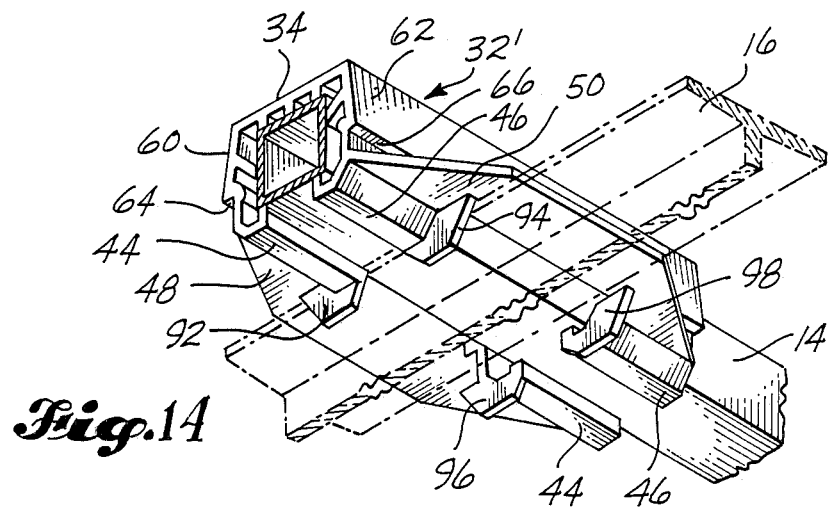
FIG. 14 is an assembled isometric view taken from below of a bearing assembled onto a guide beam and with reinforcement ribs or gussets shown abutting the transverse support beam.

FIG. 14 shows the bearing with the gussets 92, 94, 96, 98. FIG. 12 is like FIG. 14 except that the gussets have been omitted. This has been done because even without the gussets 92, 94, 96, 98 the bearing 32' is an improved bearing.

Figure 15:
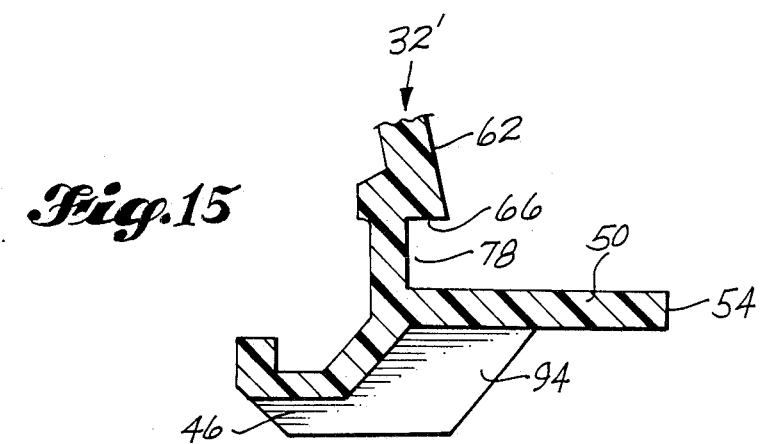
FIG. 15 is a fragmentary cross-sectional view showing a single gusset in side elevation.

FIG. 15 is an enlarged view of a gusset 94.

In the embodiment shown by FIGS. 17–19, the bearing sidewalls 108, 110 are shown to each comprise a pair of internal ribs 112, 114 and 116, 118. These ribs extend downwardly at an angle from their locations of connections to the sidewalls 108, 110. As a result, as in the earlier embodiments, a downward force applied on the sidewalls 108, 110 of the bearing 32", by the flanges 120, 122 of a floor member 124 being snapped in place, will cause the ribs 112, 114, 116, 118 to bend and this bending will allow the sidewalls 108, 110 to bend inwardly. Sufficient space is allowed inbetween the sidewalls 108, 110 and the sidewalls of the guide beam 14 to accommodate the necessary bending movement of both the sidewalls 108, 110 and the ribs 112, 114, 116, 118. That is, enough bending movement will occur to allow an inward displacement of the corner regions 126, 128 of the bearing to allow passage of the floor flanges 120, 122 past the corners 126, 128. The embodiments shown by FIGS. 17-19 may also include brace wings 130, 132. The wings 130, 132 are shown to be connected to lock flange members 134, 136. Wings 130, 132 are spaced vertically below the lower edges 138, 140 of the sidewalls 108, 110, to define with said lower edges 138, 140 a slot-like space into which the inner free edges of the floor member flanges 120, 122 are received when the bearing is installed on its guide beam 14 and the floor member 124 is installed on the bearing.

As in the earlier embodiments, the lower central region of the bearing 106 is cut away at 142, to provide room for relatively large size fillet welds between the guide beam 14 and an upper portion of the cross frame member to which the guide beam 14 is secured. In this embodiment, the curved surfaces 144, 146 of the lock flanges 134, 136 function as cams for camming the bearing 32'' onto the guide beam 14.

In each of the embodiments the vertical distance between the inner free edges of the ribs 36 and the upper free edges of the lock flanges may be slightly smaller than the vertical dimension of the guide beams 14. As a result, the lock flanges must spring somewhat as the bearings are being installed. This construction provides a good tight fit despite size differences which might exist due to manufacturing tolerances.

Of course, given the information that is set forth above, one could construct other embodiments of snap-on plastic slide bearings which will include sidewalls or side portions which can flex inwardly in response to a downward movement of a floor member, so that the floor member can be easily "snapped" into place on the bearings. And, additional embodiments of the bearings can be made in which the bearings are adapted to themselves "snap" onto the guide beams. The invention includes combining together a feature or features of a disclosed embodiment with a feature or features of one or more of the other disclosed embodiments. Also, the wings on the bearings perform an important function even if they do not make bracing contact with the wings on adjoining bearings. They may provide upper surfaces which act as bearing surfaces for the flanges of the floor members and with the lower edges of the sidewalls of the bearings form slots in which the free inner edge portions of the floor flanges are received. Also, in some installations I have used downwardly opening channel members for the guide beams instead of square tubing. When such channel material is used, the lock flanges can extend into the opening of the channel and hook onto the lower sidewall portions of the channel.

The embodiments which have been described above are presented for illustration and not limitation. I am only to be limited to the wording of the claims which follow, interpreted in accordance with the rules of claim interpretation, including the use of the doctrine of equivalents.

What is claimed is:

1. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam means, said guide beam means comprising two laterally spaced apart guide beams and a plurality of spaced apart plastic guide bearings on the guide beam means, and wherein in use the floor members are moved in one direction along the guide beam means and bearings, for advancing a load, and are retracted in the opposite direction, an improved bearing system for the floor members characterized by:

each said plastic slide bearing having a top positioned above the guide beam means, a side part on each side of the bearing depending from the top outwardly adjacent the sides of the guide beam means, a bottom lock flange projecting inwardly from each side part below the guide beam means, and a wing on each side of the bearing, extending laterally outwardly from the bearing, said wings being in coplanar parallelism with each other and being spaced below and in parallelism with the top of the bearing, said bearing top being of a width smaller than the space between the two bottom flanges of the floor member, and each side part of each bearing including a sidewall which slopes downwardly and outwardly to a lower edge, with a space being defined between each sidewall and an adjoining side of the guide beam means, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, each said sidewall being resiliently connected to the bearing and being movable inwardly into the space between it and the adjoining side of the guide beam means, such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to swing inwardly to allow the floor member to move downwardly until the bottom flanges are in the slots defined between the bottom edges of the sidewalls and the top surfaces of the wings, at which time the sidewalls will swing outwardly into positions placing their lower edges above the bottom flanges of the floor member.

2. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam means and a plurality of spaced apart plastic guide bearings on the guide beam means, and wherein in use the floor members are moved in one direction along the guide beam means and bearings, for advancing a load, and are retracted in the opposite direction, an improved bearing system for the floor members characterized by:

each said plastic slide bearing having a top positioned above the guide beam means, a side part on each side of the bearing depending from the top outwardly adjacent the sides of the guide beam means, a bottom lock flange projecting inwardly from each side part below the guide beam means, each said lock flange having an upper portion connected to the sidwall on its side of the bearing inwardly adjacent the lower edge of said sidewall portion, and a wing on each side of the bearing, extending laterally outwardly from the bearing, said wings being in coplanar parallelism with each other and being spaced below and in parallelism with the top of the bearing, said bearing top being of a width smaller than the space between the two bottom flanges of the floor member, and each side part of each bearing including a sidewall connected at its top to the top of the bearing and which slopes downwardly and outwardly to a lower edge, with a space being defined between each sidewall and an adjoining side of the guide beam means, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, each said sidewall being resiliently connected to the bearing and being movable inwardly into the space between it and the adjoining side of the guide beam means, and including at least one inwardly directed rib of rigid material having an inner edge which is contiguous with its side of the guide beam means when the bearing is installed on the guide beam, said rib sloping downwardly and inwardly of the bearing from its sidewall, so that it will bend and swing in response to movement of the floor member downwardly onto the bearing, to allow the sidewall of the bearing to flex inwardly such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to swing inwardly to allow the floor member to move downwardly until the bottom flanges are in the slots defined between the bottom edges of the sidewalls and the top surfaces of the wings, each said sidewall portion functioning as a cantilever beam and bending at its connection to the top of the bearing in response to a downward force imposed on it by a bottom flange of a floor member, at which time the sidewalls will swing outwardly into positions placing their lower edges above the bottom flanges of the floor member.

3. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam means transverse support beams for the guide beam means, extending transversely of the guide beam means, said support beams having upper portions on which guide beam means are supported, a plurality of spaced apart plastic guide bearings on the guide beam means positioned at the intersection of the guide beam means and a support beam, each bearing including gussets depending below its bottom lock flanges onto positions outwardly bounding the top portion of the support beam and functioning as abutments to lock the bearing in place and resist a sliding of the bearing lengthwise of the guide beam means away from the support beam in response to longitudinal forces imposed on the bearing by the floor member, and wherein in use the floor members are moved in one direction along the guide beam means and bearings, for advancing a load, and are retracted in the opposite direction, an improved bearing system for the floor members characterized by:

each said plastic slide bearing having a top positioned above the guide beam means, a side part on each side of the bearing depending from the top outwardly adjacent the sides of the guide beam means, a bottom lock flange projecting inwardly from each side part below the guide beam means, and a wing on each side of the bearing, extending laterally outwardly from the bearing, said wings being in coplanar parallelism with each other and being spaced below and in parallelism with the top of the bearing, said bearing top being of a width smaller than the space between the two bottom flanges of the floor member, and each side part of each bearing including a sidewall which slopes downwardly and outwardly to a lower edge, with a space being defined between each sidewall and an adjoining side of the guide beam means, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, each said sidewall being resiliently connected to the bearing and being movable inwardly into the space between it and the adjoining side of the guide beam means, such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to swing inwardly to allow the floor member to move downwardly until the bottom flanges are in the slots defined between the bottom edges of the sidewalls and the top surfaces of the wings, at which time the sidewalls will swing outwardly into positions placing their lower edges above the bottom flanges of the floor member.

4. A system according to claim 3, wherein the gussets are vertical walls of the bearing material which extend between and interconnect lower portions of the lock flanges and lower portions of the wings for bracing each from the other.

5. A system according to claim 4, wherein each gusset has an inner end located cam surface positioned below the lock flange on its side of the bearing which is sloped and is positioned so that the bearing can be set down onto the guide beam means and the cam surfaces of the gussets will contact side boundaries of the guide beam means, and a downward force can be applied on the bearing and such force will cause the cam surfaces to interact with the side boundaries of the guide beam means, to in turn cause a spreading apart of the side parts of the bearing and a downward movement of the bearing until the lock flanges are below the guide beam means, at which time the side parts of the bearing will move inwardly and the lock flanges will move into a position below the guide beam means.

6. A system according to claim 3, wherein the guide beam means comprises two guide beams.

7. A system according to claim 4, wherein the guide beam means comprises two guide beams.

8. A system according to claim 5, wherein the guide beam means comprises two guide beams.

9. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam means and a plurality of spaced apart plastic guide bearings on the guide beam means, and wherein in use the floor members are moved in one direction along the guide beam means and bearings, for advancing a load, and are retracted in the opposite direction, an improved bearing system for the floor members characterized by:

each said plastic slide bearing having a top positioned above the guide beam means, a side part on each side of the bearing depending from the top outwardly adjacent the sides of the guide beam means, a bottom lock flange projecting inwardly from each side part below the guide beam means, and a wing on each side of the bearing, extending laterally outwardly from the bearing, said wings being in coplanar parallelism with each other and being spaced blow and in parallelism with the top of the bearing, said bearing top being of a width smaller than the space between the two bottom flanges of the floor member, each bearing including, on its sides, gussets in the form of vertical walls of the bearing material which extend between and interconnect lower portions of the lock flanges and lower portions of the wings for bracing each from the other, and each side part of each bearing including a sidewall which slopes downwardly and outwardly to a lower edge, with a space being defined between each sidewall and an adjoining side of the guide beam means, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, each said sidewall being resiliently connected to the bearing and being movable inwardly into the space between it and the adjoining side of the guide beam means, such that the floor member can be set down on top of the bearing, with the top of the bearing positioned in the space between the two bottom flanges of the floor member, and floor member can then be pushed downwardly, and the downward force applied by the flanges of the floor member on said sidewalls of the bearing will cause the sidewalls to swing inwardly to allow the floor member to move downwardly until the bottom flanges are in the slots defined between the bottom edges of the sidewalls and the top surfaces of the wings, at which time the sidewalls will swing outwardly into positions placing their lower edges above the bottom flanges of the floor member.

10. A system according to claim 9, wherein each gusset has an end surface positioned below the lock flange on its side of the bearing which is sloped and functions to cam the bearing onto the guide beam means, and is positioned so that the bearing can be set down onto the guide beam means and the cam surfaces of the gussets will contact side boundaries of the guide beam means, and a downward force can be applied on the bearing and such force will cause the cam surfaces to interact with the side boundaries of the guide beam means, to in turn cause a spreading apart of the side parts of the bearing and a downward movement of the bearing until the lock flanges are below the guide beam means, at which time the side parts of the bearing will move inwardly and the lock flanges will move into a position below the guide beam means.

11. A system according to claim 9, wherein the guide beam means comprises two guide beams.

12. A system according to claim 10, wherein the guide beam means comprises two guide beams.

13. For use with a reciprocating floor conveyor of a type comprising a plurality of elongated floor members, each of which is of channel form comprising a top panel, a pair of opposite side panels extending downwardly from the top panel, and a pair of bottom flanges projecting inwardly from the side panels and defining a space between them, and each of which is supported on and guided by an elongated metal guide beam means and a plurality of spaced apart plastic guide bearings on the guide beam means, an improved plastic slide bearing adapted to snap fit onto the guide beam means and to permit the floor member to be snap fitted onto it, said plastic slide bearing comprising:

a top which in use is positioned above the guide beam means, a side part on each side of the bearing depending from said top and in use occupying a position outwardly adjacent the sides of the guide beam means, and a bottom lock flange projecting inwardly from each side part and having an upper portion connected to the sidewall on its side of the bearing inwardly adjacent the lower edge of said sidewall portion, said lock flanges in use extending below and engaging lower portions of the guide beam means, for holding the plastic slide bearing onto the guide beam means, said lock flanges having lower cam surfaces, shaped such that the bearing can be set down onto the top of the guide beam means, with said cam surfaces positioned on upper corner portions of the guide beam means, and upon a downward force being exerted on the bearing the contact made between the upper corner portions of the guide beam means and the cam surfaces on the lock flanges will cause the side parts of the bearing to spring outwardly until the guide beam means is located horizontally between the side parts and vertically between the top and the lock flanges, of the bearings, and said bearing top being of a width smaller than the space between the two bottom flanges of the floor member, and each side part of the bearing including a sidewall which slopes downwardly and outwardly to a lower edge, connected at its top to the top of the bearing, with a space being defined between the sidewall and an adjoining side of the guide beam means, each said sidewall functioning as a cantilever beam and bending at its connection to the top of the bearing in response to a downward force imposed on it by a bottom flange of a floor member, said bearing having a width at the level of the lower edges of said sidewalls which is wider than the width of the space between the two bottom flanges of the floor member, and each said sidewall being flexibly connected to the bearing and being movable inwardly into the space between it and the adjoining side of the guide beam means, and including at least one inwardly directed rib of rigid material having an inner edge which contacts its side of the guide beam means when the bearing is installed on the guide beam means, said rib sloping downwardly and inwardly of the bearing from its sidewall, so that it will bend and swing in response to movement of the floor member downwardly onto the bearing, to allow the sidewall of the bearing to flex inwardly, such that the floor member can be set down on top of a bearing which has been installed onto a guide beam means, with the top of the bearing positioned in the space between the two bottom flanges of the floor member, and the floor member can then be pushed downwardly, and the downward force applied by the flanges of the floor member on said sidewalls of the bearing will cause such sidewalls to spring inwardly to allow the floor member to move downwardly until its bottom flanges are located below the bottom edges of the sidewalls, at which time the sidewalls will swing outwardly into positions placing their lower edges above the bottom flanges of the floor member.

14. A bearing according to claim 13, defining a space between its side parts sized to receive guide beam means in the form of two guide beams.

15. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam means and a plurality of spaced apart plastic guide bearings on the guide beam means, and further comprising drive means for moving the floor members in one direction along the guide beam means and bearings, for advancing a load, and for retracting them in the opposite direction, an improved bearing system for the floor members characterized by:

each said plastic slide bearing having a top positioned above the guide beam means, a side part on each side of the bearing depending from the top outwardly adjacent the sides of the guide beam means, and a bottom lock flange projecting inwardly from each side part below the guide beam means, said bearing top being of a width smaller than the space between the two bottom flanges of the floor member, and each side part of each bearing including a sidewall which slopes downwardly and outwardly to a lower edge, with a space being defined between each sidewall and an adjoining side of the guide beam means, said bearing having a width at the level of the lower edges of said sidewalls which is wider than the width of the space between the two bottom flanges of the floor member, each said sidewall being resiliently connected to the bearing and being movable inwardly into the space between it and the adjoining side of the guide beam means, such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to swing inwardly to allow the floor member to move downwardly until the bottom flanges are below the bottom edges of the sidewalls, at which time the sidewalls will swing outwardly into positions placing their lower edges above the bottom flanges of the floor member; said system further comprising transverse support beams for the guide beam means, extending transversely of the guide beam means, said support beams having upper portions on which the guide beam means are supported, and wherein each said plastic slide bearing is positioned at an intersection of the guide beam means and a support beam, and wherein each bearing includes gussets depending below its bottom lock flanges into positions outwardly bounding the top portion of the support beam and functioning as abutments to lock the bearing in place and resist a sliding of the bearing lengthwise of the guide beam means away from the support beam in response to longitudinal forces imposed on the bearing by the floor member.

* * * * *